United States Patent [19]

Stuart

[11] 3,983,485

[45] Sept. 28, 1976

[54] MULTI-PHASE AND MULTI-AMPLITUDE LEVEL MODULATOR AND MODULATION AND DEMODULATION METHODS

[75] Inventor: Richard L. Stuart, Simpsonville, Md.

[73] Assignee: Rixon Inc., Silver Spring, Md.

[22] Filed: Feb. 28, 1975

[21] Appl. No.: 554,112

[52] U.S. Cl.............................. 325/30; 325/38 A; 325/163; 325/320; 178/67; 332/17; 329/135
[51] Int. Cl.$^2$........................................ H04L 27/20
[58] Field of Search ........... 325/30, 163, 320, 38 A; 178/67; 179/15 BM; 332/17, 42; 329/112, 135

[56] References Cited
UNITED STATES PATENTS

| | | | |
|---|---|---|---|
| 3,369,229 | 2/1968 | Dorros | 179/15 BM |
| 3,392,238 | 7/1968 | Lender | 178/67 |
| 3,706,945 | 12/1972 | Yanagidaira et al. | 178/67 |
| 3,753,114 | 8/1973 | Burley | 325/30 |
| 3,806,807 | 4/1974 | Nakamura | 178/67 |
| 3,887,768 | 6/1975 | Forney et al. | 178/67 |

Primary Examiner—Robert L. Griffin
Assistant Examiner—Jin F. Ng
Attorney, Agent, or Firm—Larson, Taylor and Hinds

[57] ABSTRACT

A multi-phase, multi-amplitude level modulation method, and modulator, is provided which produces a three-level, ten-phase modulated carrier. The carrier is modulated in three amplitude levels, viz., off, intermediate and high and in ten phase positions, to produce sixteen signal states, one state corresponding to the carrier being off, five intermediate amplitude level states having five equally spaced phase positions, and ten high amplitude level states having ten equally spaced phase positions. A number of different four digit binary coding schemes for the sixteen signal states are disclosed together with other different coding and modulation techniques.

32 Claims, 14 Drawing Figures

*Differential-Coherent Demodulation*

MULTI-PHASE AND MULTI-AMPLITUDE LEVEL MODULATOR AND MODULATION AND DEMODULATION METHODS

FIELD OF THE INVENTION

The present invention relates to modulation techniques for digital data communication systems and, more particularly, to a multi-phase, multi-amplitude modulation method and modulator.

BACKGROUND OF THE INVENTION

Digital data, which comprises a series of rectangular pulses, cannot be directly transmitted by means of voice frequency telephone lines because of the limited bandwidth of such lines. Digital data is normally transmitted via telephone lines by modulating a carrier frequency in the voice band and then transmitting the modulated carrier over the telephone line. Digital data is sometimes filtered to limit the bandwidth thereof and the filtered data used to modulate the carrier. Alternatively, the data may be used to directly modulate a carrier, the modulated carrier then being filtered before application to the telephone line. Prior art modulation techniques include frequency modulation, double sideband amplitude modulation, single sideband amplitude modulation, multi-phase modulation, and phase and amplitude (double sideband) modulation.

SUMMARY OF THE INVENTION

According to the invention, a modulation method and transmitter modulator are provided which enable the transmission of digital data at high rates over both conditions and ordinary unconditioned telephone lines. The modulation technique of the invention is inherently more tolerant of typical telephone line disturbances and characteristics than are other techniques now currently employed for high speed digital data transmission. The disturbances and characteristics referred to include noise, phase jitter, frequency translation, non-linear harmonic distortion, limited amplitude-frequency response, and non-linear phase characteristics (widely varying envelope delay characteristics). Other advantages of this technique include relatively simple implementation thereof, which implementation can be readily provided using digital large scale integrated circuits. Further, an automatic equalizer can also be adapted to the modulation technique of the invention.

The modulation technique of the invention comprises modulating a carrier with three amplitude levels and ten phase positions to produce a three-level, ten-phase modulated carrier having 16 signal states. These states comprise a zero level or carrier off state, five states of intermediate amplitude and five different phase positions, and ten states of high amplitude and 10 different phase positions. Five alternate signal states of the 10 signal states of the high level are in phase with the five signal states of the intermediate level.

The 16 states are advantageously coded as four digit binary numbers and several coding schemes of particular merit are disclosed hereinafter. In addition, further modulation and coding schemes providing specific advantages are also disclosed.

Other features and advantages of the invention will be set forth in, or apparent from, the detailed description of preferred embodiments thereof found hereinbelow.

DESCRIPTION OF THE PREFERRED EMBODIMENTS

Multi-phase modulation and multi-amplitude modulation are conveniently represented by the signal space diagrams described hereinafter. Such a diagram uses a point in space that defines the state of a phasor which is the instantaneous value of the modulated carrier. If the carrier amplitude is modulated, the magnitude of the carrier varies in accordance with the modulating signal. If the carrier phase is modulated, the angular position of the phasor varies around a circle having a radius equal to the amplitude of the carrier. Thus, referring to FIGS. 1($a$) to 1($d$), signal space diagrams are shown for a few prior art modulating systems. In particular, FIG. 1($a$) is a signal space diagram for a two-level, AM, suppressed carrier system, FIG. 1($b$), a four-phase PM system or a quadrature AM system (two, two-level AM signals in quadrature), FIG. 1($c$), an eight-phase PM system, and FIG. 1(($d$)), quadrature AM system (four-level on suppressed quadrature carriers) or an inefficient four-phase, two-level modulating system.

Figure 1D:
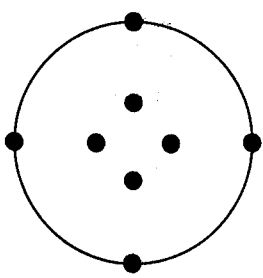
FIGS. 1($a$) to 1($d$) are signal space diagrams representing various prior art modulation methods.
Figure 1C:
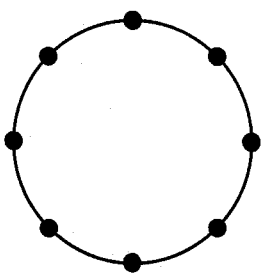
Figure 1B:
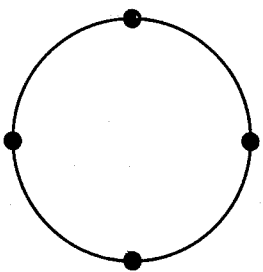
Figure 1A:
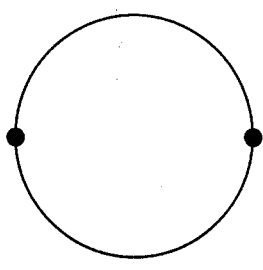
Figure 2:
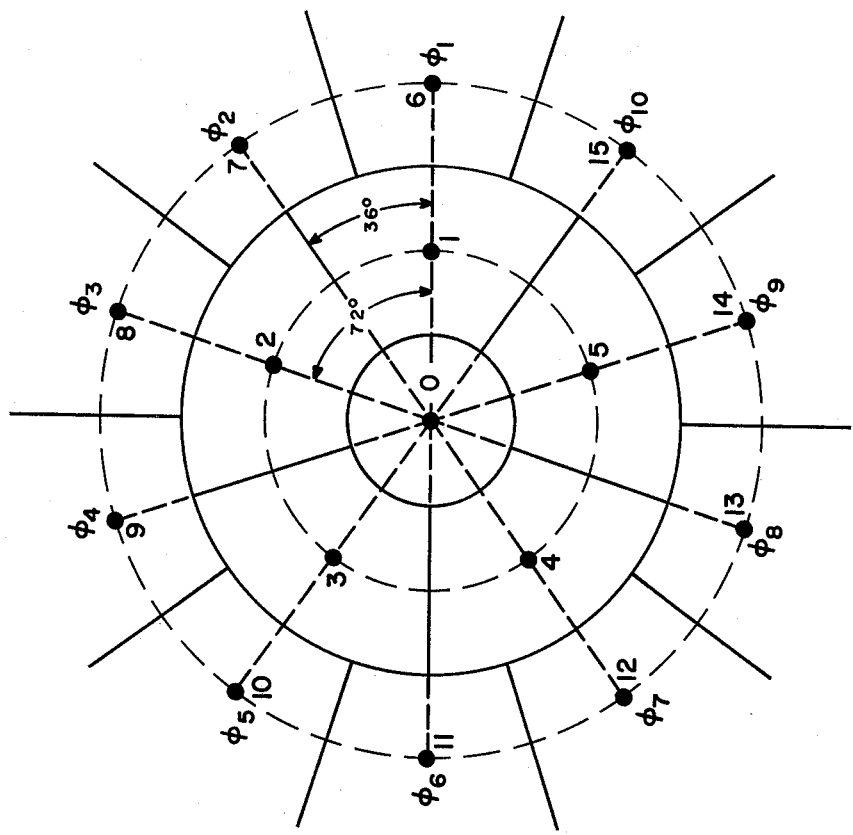
FIG. 2 is a signal space diagram of the multi-phase, multi-amplitude level basic modulation method and error decision regions of the invention.

Referring to FIG. 2, a signal space diagram of the basic modulation scheme of the invention is shown. As illustrated, there are 16 possible states for the carrier and these have been numbered 0 to 15. State 0 corresponds to no carrier, i.e., to the carrier-off state. Considering some further examples, state 6 corresponds to a full amplitude carrier with a zero degrees phase angle, while state 7 corresponds to a full amplitude carrier with a phase advance of 36° relative to the phase of reference state 6, and state 2 corresponds to a phase advance of 72° relative to reference phase of state 6½ amplitude. As illustrated, there are five inner phases separated by 72° and 10 outer phases separated by 36°.

In operation, the transmitter or the modulator at the transmitting location sends a carrier, having one of the sixteen states of FIG. 2 randomly, for a period of 1 baud. Since the transmitter carrier phase and amplitude has 16 states, groups of four binary digits can be transmitted for each state ($2^4 = 16$).

The solid lines in FIG. 2 define the error decision regions. The error decision region of any state is defined as the region in which the state will not be misinterpreted as one of the neighbouring states. During transmission, random noise, amplitude distortion and phase distortion will cause one or more states to deviate from the ideal amplitude and phase. Errors occur when the degree of deviation puts the state on the boundary or outside the decision region.

The theoretical error probabilities of the basic modulation scheme are given in the table below. These probabilities were calculated by numerical integration using Simpsons's rule. They are adjusted for a noise bandwidth of 2700 Hz and signal bandwidth of 2400 Hz.

ERROR PROBABILITIES CALCULATED BY NUMERICAL INTEGRATION

| SNR | PE0 | PE1 | PE2 | PE |
|---|---|---|---|---|
| 17.0 | 6.6584E-03 | 1.6801E-03 | 7.5066E-04 | 1.4104E-03 |
| 17.5 | 3.6123E-03 | 8.4702E-04 | 3.7499E-04 | 7.2483E-04 |
| 18.0 | 1.8188E-03 | 3.9696E-04 | 1.7478E-04 | 3.4697E-04 |
| 18.5 | 8.4223E-04 | 1.7146E-04 | 7.5325E-05 | 1.5330E-04 |
| 19.0 | 3.5504E-04 | 6.7579E-05 | 2.9699E-05 | 6.1870E-05 |
| 19.5 | 1.3469E-04 | 2.4032E-05 | 1.0583E-05 | 2.2548E-05 |
| 20.0 | 4.5400E-05 | 7.6117E-06 | 3.3617E-06 | 7.3172E-06 |
| 20.5 | 1.3401E-05 | 2.1159E-06 | 9.3741E-07 | 2.0846E-06 |
| 21.0 | 3.4084E-06 | 5.0775E-07 | 2.2561E-07 | 5.1270E-07 |
| 21.5 | 7.3355E-07 | 1.0328E-07 | 4.6025E-08 | 1.0689E-07 |
| 22.0 | 1.3089E-07 | 1.7480E-08 | 7.8337E-09 | 1.8539E-08 |

Referring to the table, column 2, headed PE0, gives the probability of error of state "0" of FIG. 2 for the listed signal to noise ratios (SNR). Column 3, headed PE1, gives the probability of error of the intermediate levels, i.e., states 1, 2, 3, 4 and 5 of FIG. 2, and column 4, headed PE2, gives the probability of error of the outer levels, i.e., states 6 to 15 of FIG. 2. The overall error rate is given by the last column, headed PE, and the numbers there are obtained by taking the probability of error for the center state (PE0) and multiplying this by the fractional time the state occurs, where all states are equi-probable. Thus, the weighted PE0=λ PE0 × 1/16. The intermediate level states has the probability thereof multiplied by 5/16 hence resulting in a weighted PE1=PE1 × 5/16. Similarly, the weighted PE2=PE2 × 10/16. Thus, referring to the table, at 20db SNR, where PE0=4.5400 × $10^{-5}$, PE1=7.6117 × $10^{-6}$ and PE2=3.3617 × $10^{-6}$, the weighted PE0=1/16 PE0=0.28375 × $10^{-5}$, the weighted PE1=5/16 PE1=0.237865 × $10^{-5}$ and the weighted PE2=10/16 PE2=0.210106 × $10^{-5}$. Hence, PE= Σ weighted PE0 + weighted PE1 + weighted PE2 = 0.73172 × $10^{-5}$.

Figure 3:
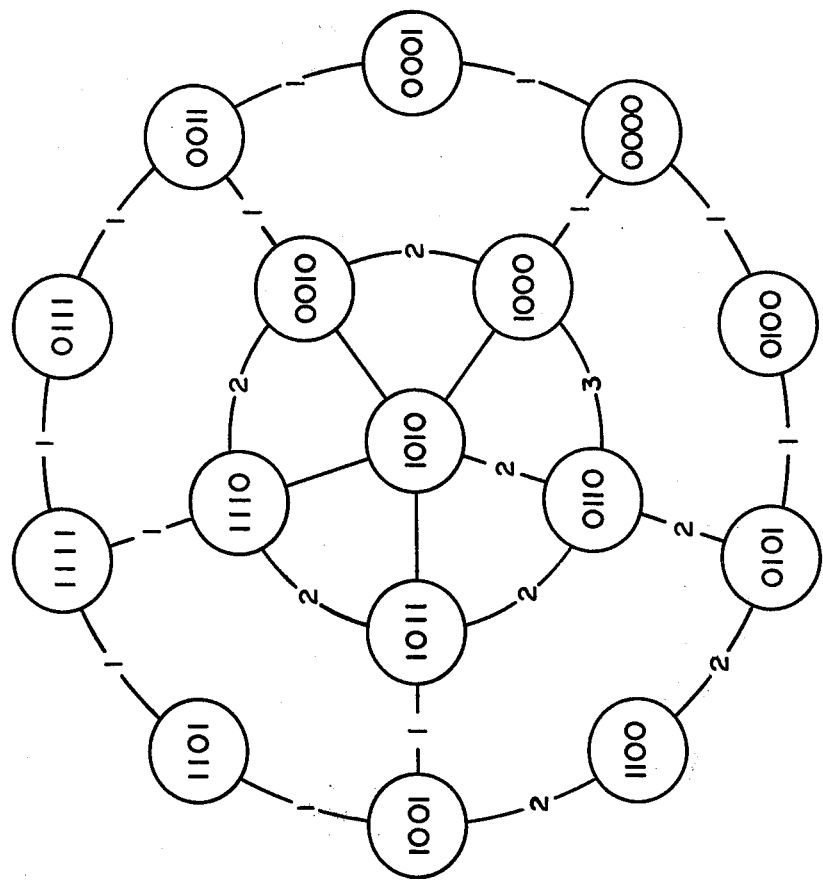
FIGS. 3 to 5 are signal space diagrams similar to that of FIG. 2 illustrating several four-digit binary coding schemes in accordance with the invention.

At the transmitter, an encoder is provided which codes groups of four, two level binary signals into one of 16 states for transmission. A signal space diagram corresponding to that of FIG. 2, but showing the allocation of four bit groups to the phase and amplitude levels of the carrier, is shown in FIG. 3. With this encoding scheme, the center level, i.e., carrier off, is decoded at the receiver as the four bits, 1010. A carrier phase at 180° in the intermediate levels is decoded at the receiver as the four bits 1011. It will be noted that in FIG. 3, neighboring states in most cases differ in their coding by only one bit. This is desirable because noise spikes generally cause one signal state to be misread as an adjacent signal state and thus noise spikes will generally cause only one of the four bits in the state to be in error. Exceptions do, however, occur in the coding shown and these are indicated in FIG. 3 by the numbers given on the lines joining the various states. For example, in FIG. 3, a transmitted 1100 might be misread due to noise as a 1001 or 0101 producing in each case two bits in error. The coding scheme of the invention includes the following related codes: (1) the code shown in FIG. 3; (2) the reverse of the coding, i.e., with all ones changed to zeroes and vice versa; and (3) the mirror image of the coding shown, i.e., with all patterns reversed left to right (1011 to 1101, 1010, to 0101 and so on).

Figure 4:
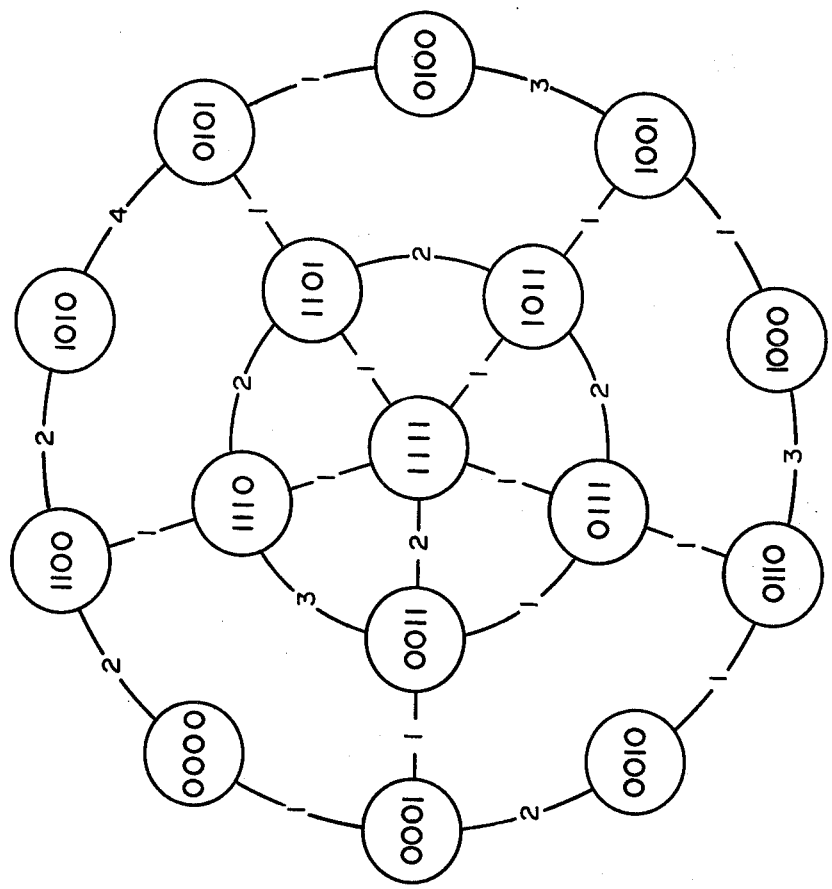

Referring to FIG. 4 an alternative coding scheme is illustrated which has some advantages over that of FIG. 3. The coding scheme of FIG. 4 utilizes "Gray" coding along the radii to minimize total errors. With this coding scheme, the code patterns change by one bit along the radii with one exception. On the other hand, the code illustrated in FIG. 4 has more total state changes where more than one bit is inverted than that of FIG. 3, but these occur at less probable error locations.

Figure 5:
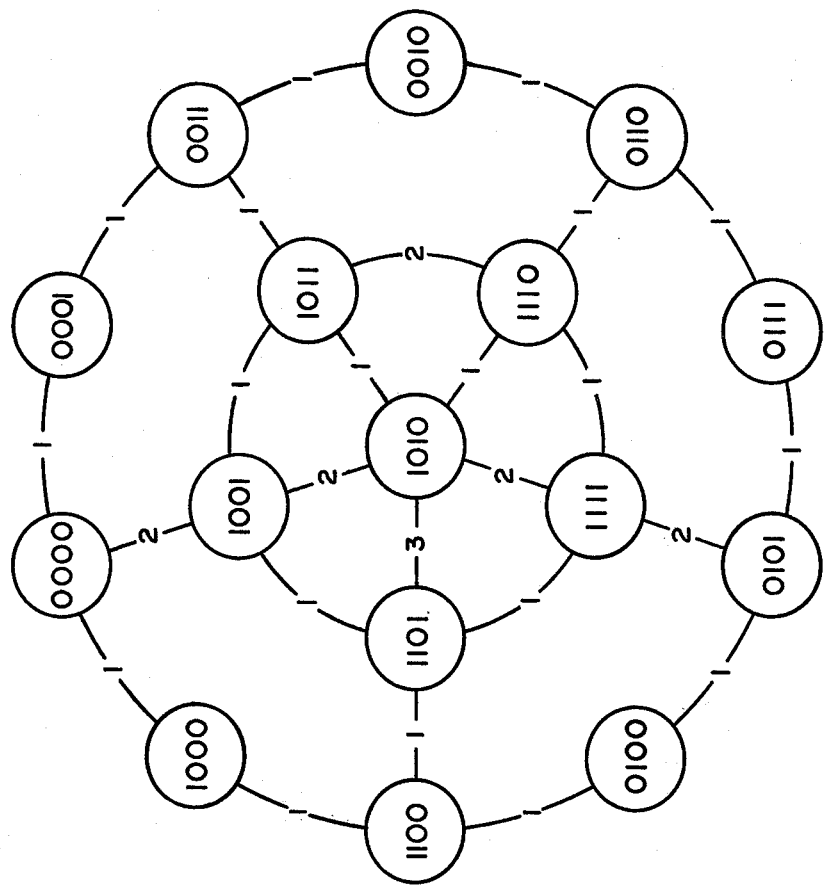

FIG. 5 shows another coding scheme of interest.

Figure 6:
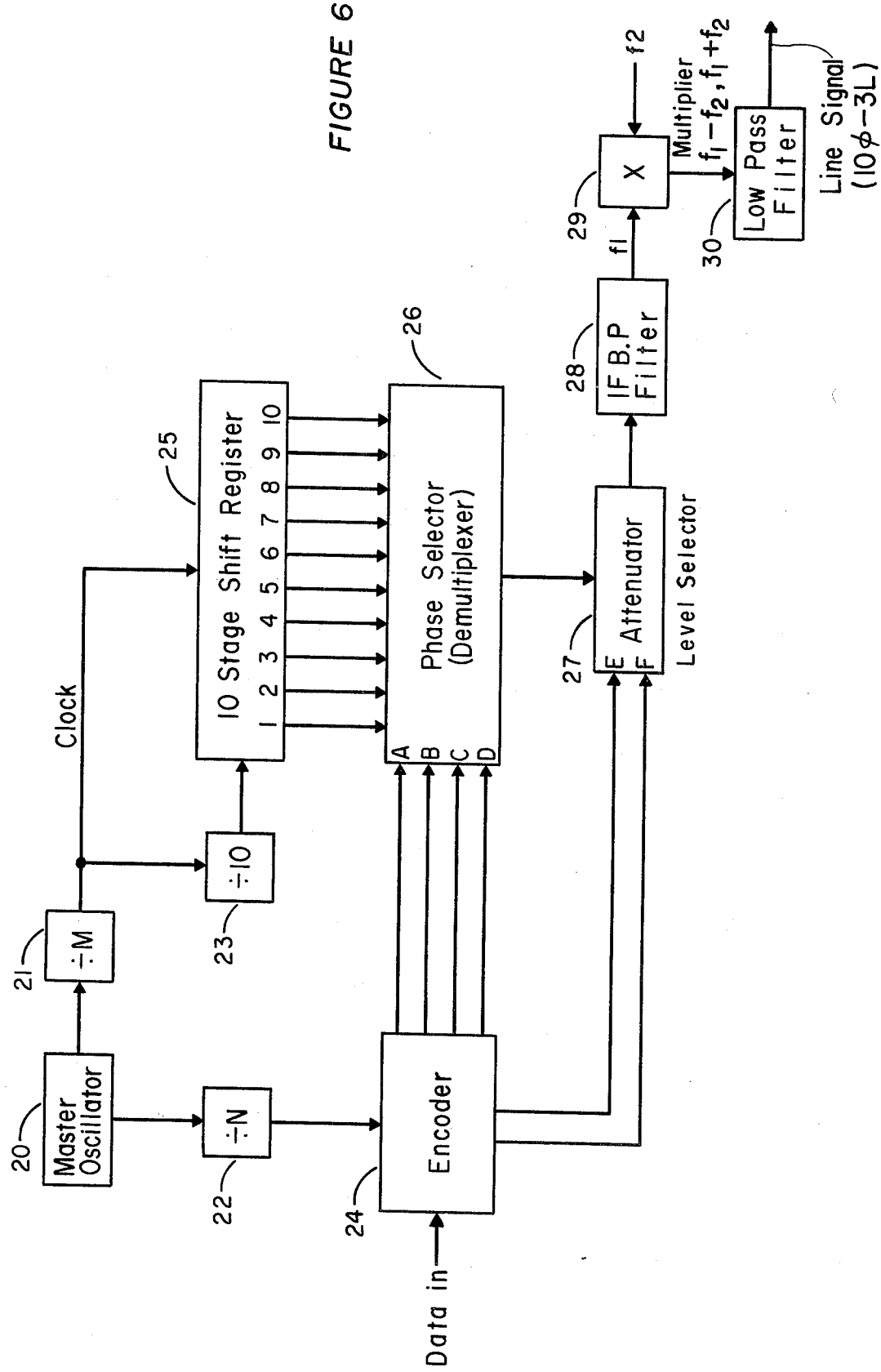
FIG. 6 is a block circuit diagram of one embodiment of a multi-phase, multi-amplitude level transmitter in accordance with the invention.

Referring to FIG. 6, a multi-phase, multi-level transmitter is shown which can be used to generate the 16 ten-phase, three-level signal states discussed above. The transmitter includes a master oscillator 20 whose output is connected to a divide by M divider network 21 and a divide by N divider network 22. The output of divider 21 is connected to the input of a divide by ten divider 23 whose output forms the input to a ten-stage, serial-in parallel-out shift register 25. The output of divider 21 is also used directly to clock the shift register 25. The output of each stage of shift register 25 is a square wave delayed in time which is equivalent to a phase shift. The parallel outputs of shift register 25 are fed to a phase selector (demultiplexer) 26. The incoming data is read into an encoder 24 such as referred to above, using a data clock formed by the output of divider 22.

The incoming data is encoded in such a manner that the outputs A, B, C and D of the encoder 24 form the addresses which correspond to the ten different phases of the signal space diagram of FIG. 3. For example, address 0001 will select phase "one" (0°), addresses 0010 and 0011 will select phase "two" (36°), and so on. The outputs E and F of encoder 24 are used to control the amplitude of the output of an attenuator 27 which receives the output of phase selector 26 and a second input. For example, again referring to FIG. 3, if the transmitted codes are 0011 and 0010, then the output levels at the output of attenuator 27 are L and L/2, respectively.

The output of attenuator 27 is connected to the input of an I.F. filter 28 which serves to band limit the phase modulated signal at the carrier frequency $f1$. Filter 28 is connected to a multiplier 29 which multiplies the $f1$ output thereof by a frequency $f2$ to produce a frequency $fc=f1-f2$ which is the desired carrier frequency. The output of multiplier 29 is passed through a lowpass filter 30 to reject the high frequency ($f1+f2$) components. The output of lowpass filter 30 is a band-limited, ten-phase, three-level signal.

Figure 7:
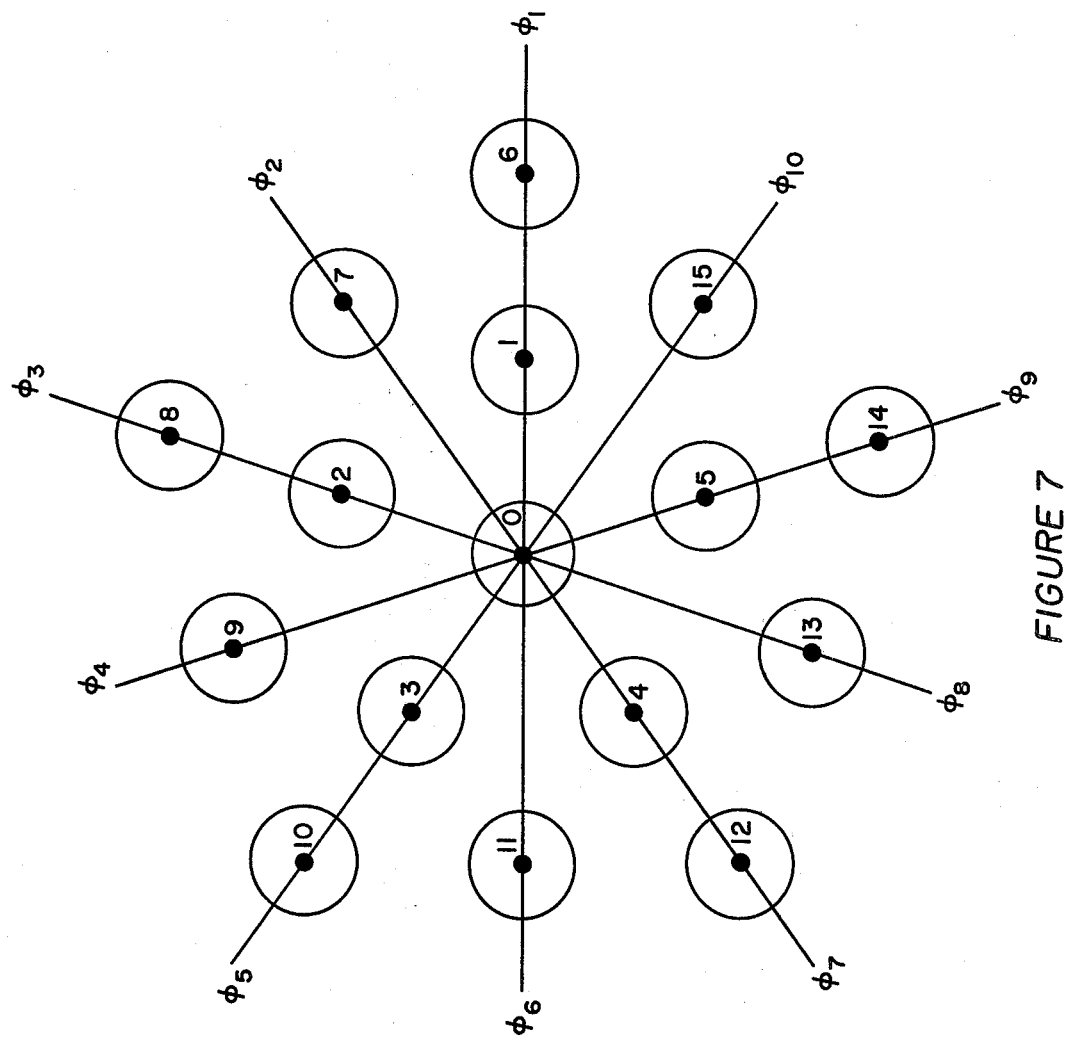
FIGS. 7 and 8 are signal space diagrams similar to that of FIG. 2 illustrating further embodiments of the basic modulation method of the invention.

In accordance with a variation of the signal space diagram shown in FIG. 3, which provides an improvement of the overall error rate of the system, the states 7, 9, 11, 13 and 15 are moved toward the center (state 0) of the signal space diagram as indicated in FIG. 7. More specifically, each of these states are moved radially inward to the point where the radius intersects a line drawn between adjacent outer states. Thus, considering state 7 as exemplary, the point corresponding to this state is moved inwardly until it intersects a line drawn between states 6 and 8. All states except states 7, 9, 11, 13 and 15 of FIG. 6, are the same as those of FIG. 2. The system of FIG. 7 utilizes 0.7db less power than that of FIG. 2. The states of FIG. 7 are, however, packed tighter so that state 3, for example, can cause equiprobable errors to states 10, 9, 11 and 0. In the system whose signal space diagram is shown in FIG. 2, most of the errors caused by state 3 come primarily from interstate interference with states 0 and 10. Based on these considerations, it is estimated that the system of FIG. 7 will have a 0.5db lower S/N ratio for a fixed error rate than that of FIG. 2.

Figure 8:
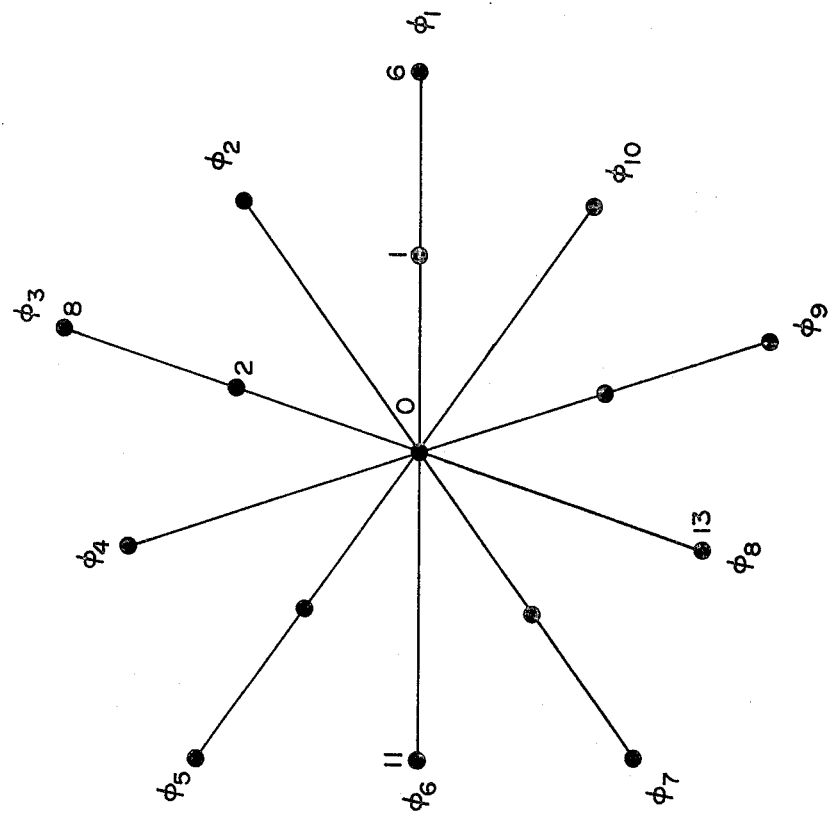
Figure 9:
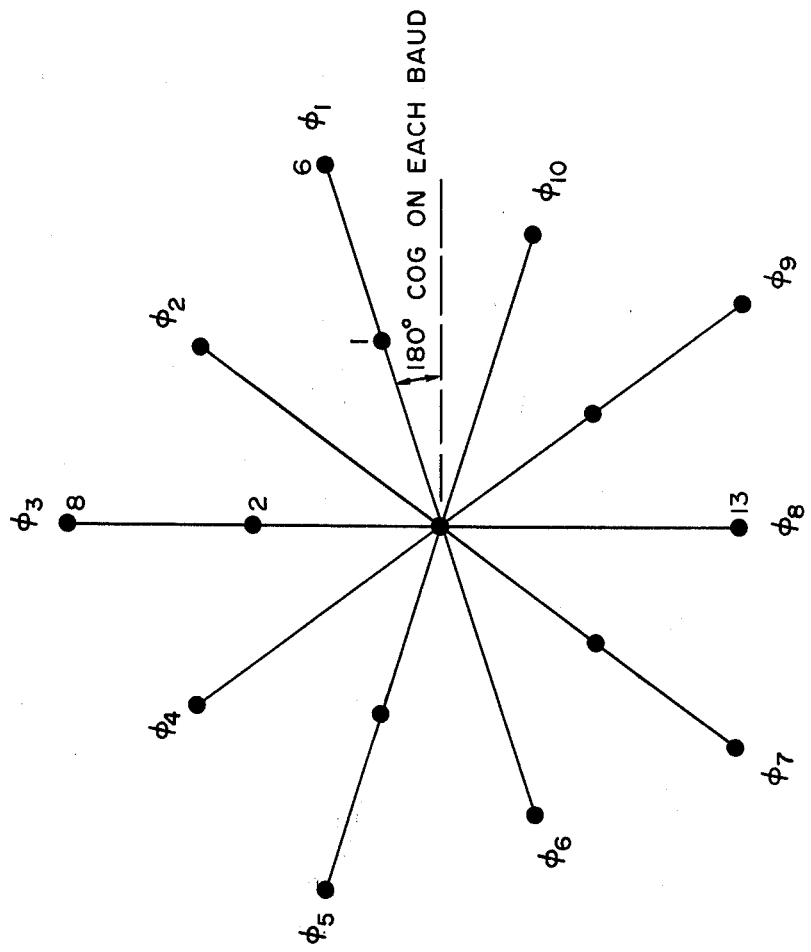
FIG. 9 is a signal space diagram similar to that of FIG. 2 illustrating an extension of the basic modulation method of the invention.

FIGS. 8 and 9 illustrate a further modification of the modulation method discussed above. In particular, FIG. 8 is a simplified version of FIG. 7 with the axes marked $\phi_1$ to $\phi_{10}$ representing the phases of the signal states for the first transmitted baud. A baud is the real time interval of the keying or signaling rate and is equal to N times one serial binary bit interval, where N is the encoding level and in this case is equal to four ($2^4 = 16$). On the second transmitted baud all signal states are advanced by 18° counterclockwise as illustrated in FIG. 9. Similarly, on the third transmitted baud the signal states are advanced by 18° counterclockwise and this rotation sequence (cogging) is repeated for each baud. At the receiver, this "cogging" of the phase angle creates no problem in detection as the additional 18° steps can be subtracted from the decoded signal. The cogging of the signal is introduced to assure that there will always be strong and equal components of the signal along the X and Y axes of FIGS. 8 and 9 which is desirable for the operation of an automatic equalizer at the receiver.

Figure 10:
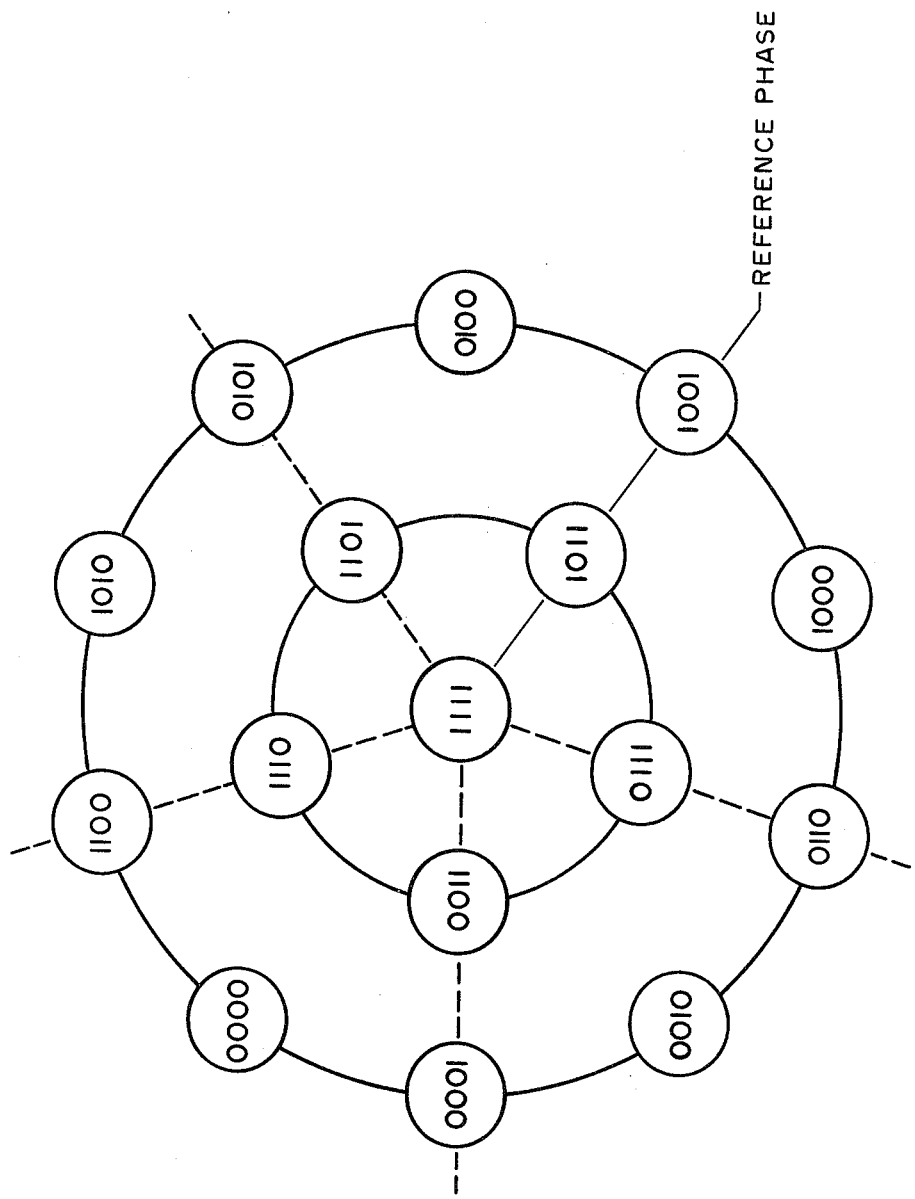
FIG. 10 is a signal space diagram similar to those of FIGS. 3, 4 and 5, illustrating a differential coding scheme in accordance with the invention.

Decoding of the signal of FIG. 3 at the receiver requires that the absolute phase of the received signal be detected. Detection of the absolute phase is difficult and requires relatively complex circuitry. By employing differential coding in the system, absolute phase detection is not required. In differential coding, data is recovered by detecting the change in carrier phase by comparing the carrier phase with the phase of the previous state. Reference is made to Lucky, Salz and Weldon, Jr., "Principles of Data Communication", McGraw-Hill, page 247 and A. S. Rosenbaum, "PSK Error Performance", *Bell System Technical Journal*, Feb., 1969, page 423, for a further discussion of differential demodulation techniques. Referring now to FIG. 10, a differential coding technique for the invention is illustrated. In accordance with this technique, four data bits are determined by the change in carrier phase relative to the phase of the previous state. Thus, the carrier phase is compared with its phase during the previous baud. For example, in FIG. 10, if there is no phase change relative to the previous state phase, the state is decoded as 1001. If there is no state phase change but the signal is at the intermediate level, the state is decoded as 1011. With a 72° phase advanced and the signal at the outer level the state is decoded as 0101. When a 1111 is transmitted the carrier is off and, for this special case, the receiver compares the phase of the next transmitted signal to that of the last transmitted signal. With this differential coding and decoding method, the receiver reference carrier phase can be along any of the five radii of FIG. 10 with no errors in received data. The differential encoding technique described increases the baud error rates of Table 1 by approximately two times but greatly reduces the amount of hardware required and simplifies the implementation of the receiver.

Improvement in the performance of the system in the presence of phase jitter can be achieved without appreciable degradation in error rate versus S/N performance. This is done using a novel demodulation method or technique, which combines both the differential demodulation and the coherent demodulation. In accordance with this technique, the five states of the intermediate level are detected using coherent demodulation, while the ten states of the high level are detected using differential demodulation. In accordance with this partially coherent demodulation technique the recovered reference carrier used for coherent demodulation is phase locked to a reference phase in the high level states. When the signal is one of the five states of the intermediate level, coherent demodulation is achieved by using the last phase of the ten high level states, updated by the phase decisions of the intermediate level, as a reference.

Thus, the demodulation process is as follows:

1. High level to high level changes of state are differentially demodulated so that their phases are simply compared. This is also true for high level to low level changes of state.

2. Intermediate level to intermediate level changes of state are coherently demodulated.

3. The zero level or carrier off state the phase is referenced to the phase of the signal in the previous state.

Figure 11:
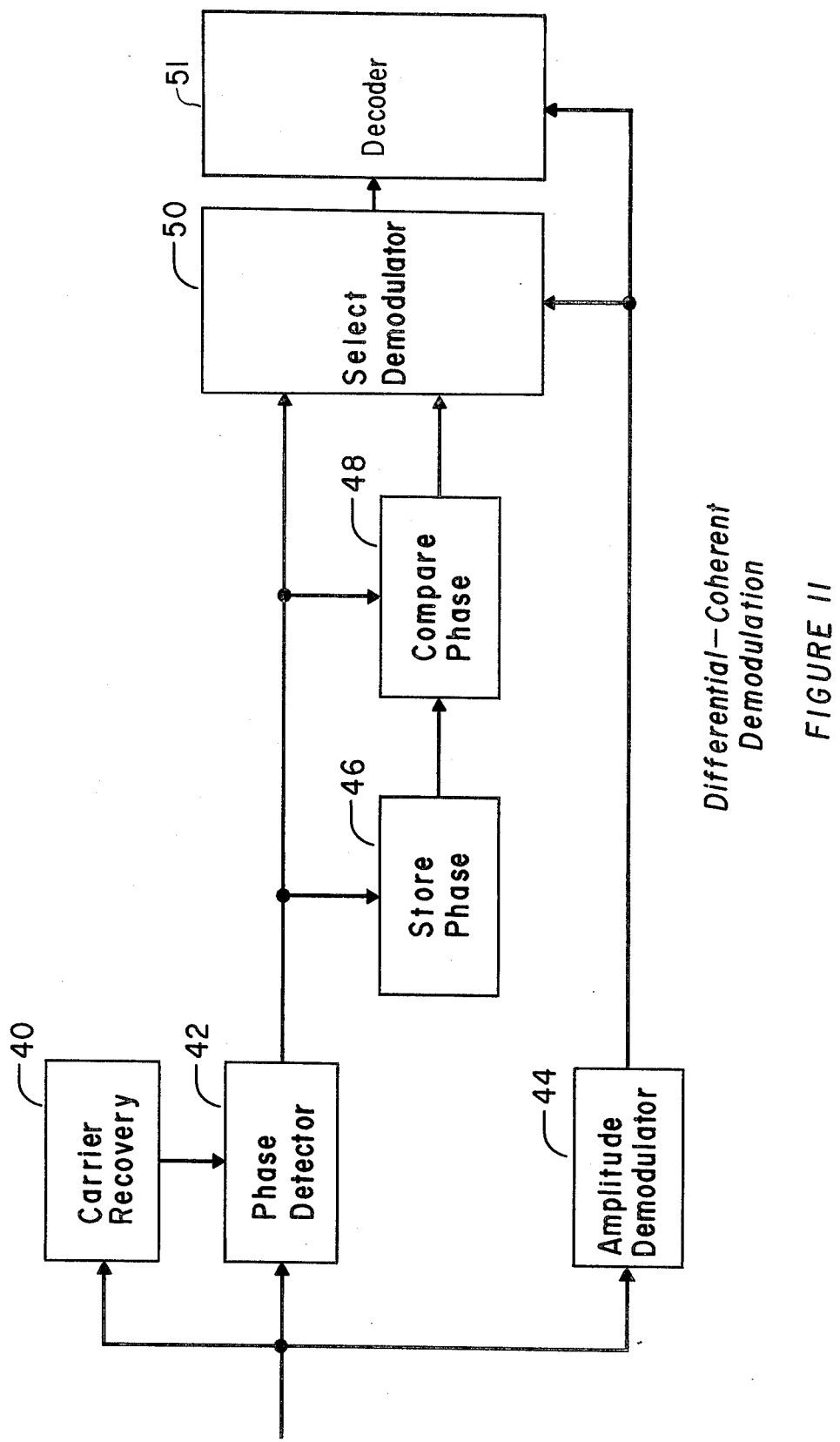
FIG. 11 is a block circuit diagram of a demodulator in accordance with a further embodiment of the invention.

Referring to FIG. 11, which is a block diagram representation of a circuit for carrying out the demodulation technique described above, the amplitude-phase modulated signal is applied to a carrier recovery circuit 40, a phase detector 42 and an amplitude demodulator 44. The recovered carrier signal produced by carrier recovery circuit 40 is used in phase detector circuit 42 to produce a detected phase signal. This signal is stored in a storage circuit 46 and is compared with the previously stored phase signal by a phase comparator circuit 48. The outputs of phase detector 42, phase comparator 48 and amplitude demodulator 44 are each connected to a demodulation selector circuit 50. As stated, high level to high level changes of state and high level to low level changes of state are differentially demodulated, i.e., their phases are compared. On the other hand, intermediate level to intermediate level changes of state are coherently demodulated, i.e., the phase of the received signal is compared with a reference phase. For the zero level state, the phase is referenced to that of the signal in the previous state. A decoder is connected to the output of selector circuit 50.

The invention can also be extended to include a more sophisticated demodulation technique, the multiple demodulation. The multiple demodulation is a differential demodulation technique with circuits to store three phase changes between four successive bauds and the process of storage sampling repeated after the flow of two bauds. Using the stored information the differential phase change can be computed for two additional phases. Majority logic is then used for three decisions to determine the most probable phase change.

Although the invention has been described with respect to exemplary embodiments thereof, it will be understood by those skilled in the art that variations and modifications can be effected in these embodiments without departing from the scope and spirit of the invention.

I claim:

1. A multi-phase, multi-amplitude level modulation method comprising generating a carrier signal, generating a modulating signal having first, second and third amplitude levels and ten phases, and modulating said carrier with said first, second and third amplitude levels and ten phases to produce sixteen signal states, said first level corresponding to carrier off operation and providing a first signal state, said second level comprising an intermediate level and said carrier being modulated at five equally spaced phases for said second level to provide five of said sixteen signal states, and said third level comprising an amplitude level which is substantially higher than said intermediate level and said carrier being modulated at ten equally spaced phases for said third level to provide ten of said sixteen signal states, alternate/equally spaced phases of said third level being in phase with respective phases of the five phases of the second level.

2. A modulation method as claimed in claim 1 wherein said phases of said second level are equally spaced apart by 72° and said phase positions of said third level are equally spaced apart by 36°.

3. A modulation method as claimed in claim 1 wherein said method employs differential encoding so that data is indicated by the change in carrier phase from the last carrier phase thereof.

4. A modulation method as claimed in claim 3 wherein the coding for signal states of the second level beginning at a reference phase is 1011, 1101, 1110, 0011, and 0111 and the coding for the signal states of the third level, beginning at the same reference phase, is 1001, 0100, 0101, 1010, 1100, 0000, 0001, 0010, 0110 and 1000, said first signal state, corresponding to carrier off operation, being coded 1111 and the phase of the next transmitted carrier being compared to the phase of the last transmitted carrier when the last mentioned code is transmitted.

5. A modulation method as claimed in claim 1 wherein the amplitude levels of five alternate phase positions of the third level are closer to said second level than those of the other positions.

6. A modulation method as claimed in claim 5 wherein said alternate levels lie on the intersection between a radial line corresponding to that phase position and a line joining the signal states of the two adjacent phase positions.

7. A modulation method as claimed in claim 1 wherein the phase of all signal states are retarded or advanced by a predetermined amount for each transmitted baud.

8. A modulation method as claimed in claim 7 wherein the phase of said signal states are retarded or advance by 18° for each transmitted baud.

9. A modulation method as claimed in claim 1 further comprising encoding the input data so that a four-digit binary number is provided for each signal state.

10. A modulation method as claimed in claim 9 wherein the said first level is zero or carrier off the phases of the signal states of said second level are 36°, 108°, 180°, 252° and 324° measured from a 0° reference and phases of the signal states of said third level are 0°, 36°, 72°, 108°, 144°, 180°, 216°, 252°, 288° and 324°, measured from the same reference, the signal state of the said first level being coded as 1010, the signal states of said second level being coded as follows: 36°, 0010 ; 108°, 1110; 180°, 1011; 252°, 0110; 324°, 1000; and the signal states of said third level being coded as follows: 0°, 0001; 36°, 0011; 72°, 0111; 108°, 1111; 144°, 1101; 180°, 1001; 216°, 1100; 252°, 0101; 288°, 0100; and 324°, 0000.

11. A modulation method as claimed in claim 10 wherein the coding is the inverse of that of claim 5 whereby each "1" is changed to "0" and each "0" is changed to "1".

12. A modulation method as claimed in claim 10 wherein said coding is the mirror image of that of claim 10.

13. A modulation method as claimed in claim 9 wherein the phases of the signal states of said second level are 36°, 108°, 180°, 252° and 324° measured from a 0° reference and the phases of the signal states of said third level are 0°, 36°, 72°, 108°, 144°, 180°, 216°, 252°, 288° and 324° measured from the same reference, the signal states of said second level being coded as follows: 36°, 1101; 108°, 1110; 180°, 0011; 252°, 0111; and 324°, 1011; the signal states of said third level being coded as follows: 0°, 0100; 36°, 0101; 72°, 1010; 108°, 1100; 144°, 0000; 180°, 0001; 216°, 0010; 252°, 0110; 288°, 1000; and 324°, 1001; said first level being coded 1111.

14. A modulation method as claimed in claim 13 wherein said coding is the inverse of that of claim 13, whereby each "1" is changed to "0" and each "0" is changed to "1".

15. A modulation method as claimed in claim 13 wherein said coding is the mirror image of that of claim 13.

16. A modulation method as claimed in claim 9 wherein the phases of the signal states of said second level are 36°, 108°, 180°, 252° and 324° measured from a 0° reference and the phases of the signal states of said third level are 0°, 36°, 72°, 108°, 144°, 180°, 216°, 252°, 288° and 324° measured from the same reference, the signal states of said second level being coded as follows: 36°, 1011; 108°, 1001; 180°, 1101; 252°, 1111; and 324°, 1110; the signal states of said third level being coded as follows: 0°, 0010; 36°, 0011; 72°, 0001; 108°, 0000; 144°, 1000; 180°, 1100; 216°, 0100; 252°, 0101; 288°, 0111; and 324°, 0110; said first level being coded 1010.

17. A modulation method as claimed in claim 16 wherein said coding is the inverse of that of claim 16 whereby each "1" is changed to "0" and each "0" is changed to "1".

18. A modulation method as claimed in claim 16 wherein said coding is the mirror image of that of claim 16.

19. A multi-phase, multi-amplitude level modulator comprising means for generating a carrier, means for generating a modulating signal having first, second and third amplitude levels and 10 phases, and means for modulating said carrier with said first, second and third amplitude levels and ten phases to produce sixteen signal states, said first level corresponding to carrier off operation and providing a first signal state, said second level comprising an intermediate level and said carrier being modulated at five equally spaced phases for said second level to provide five of said 16 signal states, and said third level comprising an amplitude level which is substantially higher than said intermediate level and said carrier being modulated at ten equally spaced phases for said third level to provide 10 of said 16 signal states, alternate equally spaced phases of said third level being in phase with respective phases of the five phases of the second level.

20. A modulator as claimed in claim 19 further comprising encoder means for coding each of said signal states responsive to a data input signal, said modulating signal generating means including a ten-stage serial-in, parallel-out shift register for generating ten outputs each corresponding to one of said ten phases, a phase selector connected to said shift register for selecting the one of the outputs of said shift register under the control of said encoder means, and level selector means for selecting the level of said modulating signal under the control of said encoder means.

21. A modulator as claimed in claim 20 further comprising a master oscillator, first divider means for dividing the output frequency of said master oscillator by a predetermined factor to produce a clocking signal for said shift register, second, divide-by-ten divider means connected to the output of said first divider means for producing an input signal to said shift register, third divider means for dividing the output frequency of said master oscillator by a further predetermined factor to produce a clocking signal for said encoder means, said level selector means comprising an attenuator connected to the output of said phase selector means, said modulator further comprising an intermediate frequency filter connected to the output of said attenuator for band limiting the phase modulated signal to a first carrier frequency $f_1$, multiplier means for multiplying the output of said filter with a frequency $f_2$ to produce a desired carrier frequency $f_c = f_1 - f_2$ and a further filter for rejecting the high frequency components of the output of said multiplier means.

22. A modulator as claimed in claim 19 wherein said encoder means codes each of said sixteen signal states as a different four-digit binary number.

23. A modulator as claimed in claim 22 wherein said modulating signal generating means generates five phases for the signal states of said second level of 36°, 108°, 180°, 252°, and 324° measured from a 0° reference and ten phases of the signal states of said third level of 0°, 36°, 72°, 108°, 144°, 180°, 216°, 252°, 288° and 324° measured from the same reference, and said encoder codes the signal states of said second level as follows: 36°, 1011; 108°, 1001; 180°, 1101; 252°, 1111; and 324°, 1110; and codes the signal states of said third level as follows: 0°, 0010; 36°, 0011; 72°, 0001; 108°, 0000; 144°, 1000; 180°, 1100; 216°, 0100; 252°, 0101; 288°, 0111; and 324°, 0110, said first level being coded 1010.

24. A modulator as claimed in claim 23 wherein said encoder provides coding which is the inverse of that of claim 31, whereby each "1" is changed to "0" and each "0" is changed to "1".

25. A modulator as claimed in claim 23 wherein said encoder provides coding which is the mirror image of that of claim 23.

26. A modulator as claimed in claim 22 wherein said modulating signal generating means generates five phases for the signal states of said second level of 36+, 108°, 180°, 252° and 324° measured from a 0° reference and 10 phases of the signal states of said third level of 0°, 36°, 72°, 108°, 144°, 180°, 216°, 252°, 288° and 324° measured from the same reference, and said encoder codes the signal states of said second level as follows: 36+, 1101; 108°, 1110; 180°, 0011; 252°, 0111; and 324°, 1011; and codes the signal states of said third level as follows: 0°, 0100; 36°, 0101; 72°, 1010; 108°, 1100; 144°, 0000; 180°, 0001; 216°, 0010; 252°, 0110; 288°, 1000; and 324°, 1001, said first level being coded 1111.

27. A modulator as claimed in claim 26 wherein said encoder provides coding which is the inverse of that of claim 26, whereby each "1" is changed to "0" and each "0" is changed to "1".

28. A modulator as claimed in claim 26 wherein said encoder provides coding which is the mirror image of that of claim 26.

29. A modulator as claimed in claim 26 wherein said modulating signal generating means generates five phases for the signal states of said second level of 36°, 108°, 252° and 324° measured from a 0° reference and ten phases of the signal states of said third level of 0°, 36°, 72°, 108°, 144°, 180°, 216°, 252°, 288° and 324° measured from the same reference, and said encoder codes the signal states of said second level as follows: 36°, 0010; 108°, 1110; 180°, 1011; 252°, 0110; and 324°, 1000; and codes the signal states of said third level as follows: 0°, 0001; 36°, 0011; 72°, 0111; 108°, 1111; 144°, 1101; 180°, 1001; 216°, 1100; 252°, 0101; 288°, 0100; and 324°, 0000, said first level being coded 1010.

30. A modulator as claimed in claim 29 wherein said encoder provides coding which is the inverse of that of claim 28, whereby each "1" is changed to "0" and each "0" is changed to "0".

31. A modulator as claimed in claim 29 wherein said encoder provides coding which is the mirror image of that of claim 29.

32. A demodulation method for demodulating an amplitude-phase modulated signal having 16 states comprising a zero level or carrier off state, five intermediate level states and ten high level states, said method comprising the steps of demodulating the 16 states of the amplitude-phase modulated signal by coherently demodulating the signal for the five intermediate level states by comparing the phase of the signal with a reference signal, differentially demodulating the signal for the ten high level states by comparing the phase of the signal with that of the previous state and phase comparing the phase of the signal with that of the previous state for the zero level or carrier off state and amplitude demodulating the signal to determine the signal level and the type of demodulation.

* * * * *